Patented June 3, 1947

2,421,674

UNITED STATES PATENT OFFICE 2,421,674

PREPARATION OF ISOPARAFFINS AND REACTIVATION OF THE CATALYST USED THEREIN

George W. Ayers, Chicago, Erskine E. Harton, Evanston, and Lawrence M. Henderson, Winnetka, Ill., assignors to The Pure Oil Company, Chicago, Ill., a corporation of Ohio No Drawing. Application April 30, 1943, Serial No. 485,170

6 Claims. (Cl. 260—683.5)

This invention relates to the preparation of isoparaffins in the presence of Friedel-Crafts type catalyst and to the reactivation of the catalyst.

The use of Friedel-Crafts type catalysts, such as anhydrous aluminum chloride and bromide, for the dealkylation and isomerization of paraffinic hydrocarbons is well known. In such processes normal butane, pentane, hexane or mixtures thereof, as well as higher boiling hydrocarbons, such as those containing from seven to ten carbon atoms, are contacted with the catalyst in the presence of a promoter, such as hydrogen chloride or organic chlorine compound, which will yield hydrogen chloride in the reaction zone and also in the presence of hydrogen. Under proper conditions of temperature and pressure, the reaction is predominantly one of isomerization resulting in the formation of lower boiling paraffins, especially isoparaffins, in those cases where pentane and higher boiling paraffins are charged to the process.

During the isomerization and/or dealkylation reaction, the catalyst forms a hydrocarbon complex which gradually loses activity until it no longer is effective for the intended purpose. This complex is apparently a combination of the metal halide with unsaturated hydrocarbons or polymerized unsaturated hydrocarbons.

We have discovered that Friedel-Crafts type catalysts which have become deactivated can be reactivated by contacting the complex with an isoparaffin under controlled temperatures and pressure conditions, with the result that metal chloride is recovered for further use and a higher boiling isoparaffin or alkylate is formed, suitable for use as motor fuel.

One of the objects of our invention is to provide a method for preparing isoparaffins.

Another object of our invention is to provide a method for reactivating Friedel-Crafts type catalysts which have become deactivated during use in connection with hydrocarbon conversion reactions.

A still further object of our invention is to provide a process for converting normal paraffinic hydrocarbons into higher boiling isoparaffinic hydrocarbons.

Other objects of our invention will become manifest from the following description.

In accordance with our invention, the spent aluminum chloride or other metal halide-hydrocarbon complex, which may be in the form of a viscous liquid, is contacted with an isoparaffin such as isobutane or isopentane under super-atmospheric pressure and under elevated temperature for a period of time sufficient to permit the isoparaffins to react with the hydrocarbon portion of the complex. We have found that at a temperature of approximately 120° to 235° C. and under a pressure from 100 pounds per square inch to 1500 pounds per square inch gage, isoparaffins, such as isobutane and isopentane, undergo reaction with the hydrocarbon portion of the complex to form alkylates which can be recovered and fractionated into motor fuel and other fractions. In regenerating spent catalysts, the complex may be placed in an autoclave with the isoparaffins and sufficient isoparaffin added to bring the pressure within the autoclave up to the desired point. The autoclave may then be heated to the desired reaction temperature and permitted to stand for a period of time such that no further alkylation is obtained, or additional amounts of isoparaffins may be added from time to time until no further reaction occurs. This time may vary from a period of approximately fifteen minutes to seven hours, although a period of approximately one-half hour is generally sufficient. Instead of charging the complex and the isoparaffin to an autoclave, the regeneration may be effected in the reaction chamber, used for dealkylating and/or isomerizing straight chain hydrocarbons. Where reactivation is effected in the reaction chamber, it is preferably accomplished by passing the isoparaffin slowly through the reaction chamber in contact with the complex until such time as the effluent gas indicates no further alkylation is occurring.

Although regeneration of the complex may be effected within the limits of approximately 120° to 235° C. and approximately 100 to 1500 pounds per square inch gage, we prefer to carry out the reactivation at temperatures of approximately 150° to 165° C. and at pressures of approximately 300 to 500 pounds per square inch. Under these condtiions, the reactivation proceeds most expeditiously without danger of deleteriously affecting the catalyst. An alkylation promoter such as hydrogen chloride or hydrogen chloride yielding chemicals may be used during the reactivation stage in amounts of approximately .1 to 4% of hydrogen chloride by volume based on the isoparaffin charged.

Reactivation of the metal halide-hydrocarbon complex may be carried out in connection with processes involving dealkylation and/or isomerization of hydrocarbons, such as butane, pentane, hexane or mixtures thereof, as well as higher boiling hydrocarbons, such as normal heptane, octane, nonane and decane or their corresponding olefins, in which the hydrocarbons are contacted with the aluminum halide, aluminum halide-hydrocarbon complex or other Friedel-Crafts type catalyst under normal or super-atmospheric pressure and at temperatures of approximately 20° to 150° C. in the presence of a promoter, such as hydrogen chloride or organic chloride capable of yielding hydrogen chloride in the reaction zone, and, if desired, hydrogen. Such processes are well known and therefore will not be described in detail. In the course of the reaction, the yield of isoparaffins gradually decreases until a point is reached where it is impractical to continue the reaction. At this point, the supply of normal paraffin to the reaction zone is cut off and a supply of isoparaffin, such as isobutane or isopentane is cut into the inlet side of the reaction chamber and allowed to flow slowly there-through while the desired pressure and temperature are maintained on the chamber. The effluent collected during the reactivation stage is preferably collected in a separate chamber from the effluent obtained during the straight chain hydrocarbon conversion stage. The isoparaffins for the activation stage may be a portion of the isoparaffins formed in the conversion stage or may be isoparaffins from an extraneous source.

In carrying out the process, it is desirable to have two or more reactors connected in parallel so that while one reactor is on stream charging straight chain hydrocarbon, or a mixture of such hydrocarbons, another reactor can be in the course of activation. Ordinarily, two reactors are sufficient since the activation stage will generally require less time than the "on stream" or conversion stage.

As an example of the result that may be obtained in accordance with our invention, a liquid aluminum chloride-hydrocarbon complex was prepared by refluxing normal heptane with aluminum chloride at the boiling point of normal heptane, until the complex had substantially reached a state of exhaustion insofar as ability to further dealkylate or isomerize the normal heptane was concerned. The complex was in the form of a liquid. Seven and three-tenths grams of the resulting aluminum chloride-hydrocarbon complex and 100 cc. of isopentane were placed in the steel bomb and heated for approximately six and one-half hours at a temperature which was maintained substantially the entire period at 115° to 127° C. and never exceeded 165° C. The average pressure in the bomb was 410 pounds per square inch and the maximum pressure attained was 445 pounds per square inch. The bomb and contents were permitted to stand over night and then emptied. Thirty-five cc. of colorless hydrocarbon liquid was obtained in addition to the gas containing the excess isopentane. The gas was not investigated. The liquid was washed with dilute caustic soda and water. It was then subjected to distillation and the following table gives the boiling range of the distillate:

| Per Cent Fraction Recovered | Temperature (° C.) at Cutting Point of Fraction |
| --- | --- |
| 5.6 | 36.5 |
| 11.2 | 39.5 |
| 16.9 | 41.7 |
| 22.5 | 44.0 |
| 28.1 | 46.0 |
| 33.7 | 48.4 |
| 39.3 | 51.8 |
| 44.9 | 71.5 |
| 50.6 | 104.0 |
| 56.2 | 115.5 |
| 61.8 | 122.0 |
| 67.4 | 127.2 |
| 73.0 | 131.0 |
| 75.9 | 130.5 |

The remainder of the liquid was residue. Isohydrocarbon determinations by the modified Moldavskii method, described in co-pending application, Serial No. 474,748, were made on both distillate and residue. The distillate required 5.77 cc. of bromate solution and the residue required 4.08 of bromate solution as compared to 0.18 and 4.22 cc. respectively for normal heptane and iso-octane. The result showed that the distillate was composed of isohydrocarbons of higher boiling point than isopentane and that the residue contained some unsaturated hydrocarbons. The isopentane used in the test boiled at 28° C.

As a result of the reactivation, a small amount of black tar was formed in the bomb. In order to determine whether isopentane could be further alkylated with this black tar, it was contacted with more isopentane under the same conditions as before set forth, but the isopentane was practically all recovered unchanged.

The aluminum chloride recovered from the reactivation step was refluxed with normal heptane at approximately 98° C. and under atmospheric pressure in order to determine whether it would catalyze dealkylation or isomerization. Both isomerization and dealkylation took place showing that the complex had been regenerated.

It will be seen, therefore, that not only have we discovered a method for reactivating Friedel-Crafts-hydrocarbon complexes which are no longer active, but that we have discovered a process for converting normal paraffins into high boiling isoparaffins by a two-step process involving isomerization and/or dealkylation of the paraffin in the first step by contact with a Friedel-Crafts type catalyst and the formation of the higher boiling isoparaffin in a second step by contacting the isoparaffins from the first step with the spent catalyst complex from the first step, thereby regenerating the catalyst and forming the high boiling alkylate. The alkylate so formed has a high octane number and is suitable for use in aviation motor fuel.

The steps of isomerizing and/or dealkylating straight chain hydrocarbons followed by regeneration of the catalyst by means of isoparaffins can be repeated until coke deposition on the catalyst makes further regeneration impractical.

We claim:

1. A process for converting straight chain hydrocarbons within the gasoline boiling range into branched chain hydrocarbons within the gasoline boiling range which comprises passing a stream of straight chain hydrocarbons containing from 4 to 10 carbon atoms per molecule through a Friedel-Crafts type catalyst in a reaction chamber under conditions suitable for converting straight chain to branched chain hydrocarbons, until the catalyst has formed a hydrocarbon complex and the yield of branched chain hydrocarbons has dropped to a predetermined amount, discontinuing the stream of straight chain hydrocarbons and substituting therefor a stream containing substantially only branched chain paraffins selected from the group consisting of isobutane and isopentante, passing the stream of branched chain paraffins through the catalyst under conditions suitable for reaction between the branched chain paraffins and the hydrocarbons in the catalyst complex, continuing the passage of the branched chain hydrocarbons through the catalyst until the catalyst is at least partially reactivated and then discontinuing the charge of branched chain paraffins and resuming the charge of straight chain paraffins.

2. The method in accordance with claim 1 in which the catalyst is an aluminum halide.

3. The method in accordance with claim 1 in which the straight chain hydrocarbons are passed through active catalyst while the branched chain paraffins are being passed through spent catalyst.

4. A process for converting straight chain paraffins having from four to ten carbon atoms per molecule into branched chain paraffins boiling within the gasoline boiling range comprising passing a stream of straight chain hydrocarbons through an aluminum halide catalyst in a reaction chamber in the presence of a promoter selected from the group consisting of hydrogen chloride and substances capable of yielding hydrogen chloride under reaction conditions, maintaining the reaction chamber under suitable conditions of temperature and pressure to convert straight chain paraffins to branched chain paraffins, continuing the passage of the straight chain paraffins until the catalyst forms a relatively inactive hydrocarbon complex, discontinuing the passage of the straight chain paraffins, separating isobutane and isopentane from the reaction product and contacting the isobutane and isopentane fraction produced as aforesaid with the aluminum halide-hydrocarbon complex in the substantial absence of other hydrocarbons at temperatures of approximately 120°–235° C. and at pressures of approximately 100–1500 pounds per square inch gage until the catalyst is at least partially reactivated and then resuming passage of the straight chain hydrocarbons.

5. A process in accordance with claim 4 in which the isobutane and isopentane fraction is contacted with the aluminum halide-hydro carbon complex in the presence of a promoter selected from the group consisting of hydrogen chloride and substances capable of yielding hydrogen chloride at reaction conditions.

6. A process in accordance with claim 4 in which the isobutane and isopentane fraction is contacted with the aluminum halide-hydrocarbon complex at temperatures of approximately 150°–165° C. and at pressures of approximately 300–500 pounds per square inch.

GEORGE W. AYERS.
ERSKINE E. HARTON.
LAWRENCE M. HENDERSON.

REFERENCES CITED

The following references are of record in the file of this patent:

UNITED STATES PATENTS

| Number | Name | Date |
| --- | --- | --- |
| 2,180,220 | Boyd | Nov. 14, 1939 |
| 1,608,328 | McAfee | Nov. 23, 1926 |
| 2,220,090 | Evering et al. | Nov. 5, 1940 |
| 2,293,891 | Evering et al. | Aug. 25, 1942 |
| 2,316,775 | Egloff | Apr. 20, 1943 |
| 1,427,626 | Owen | Aug. 29, 1922 |
| 1,534,130 | McAfee | Apr. 21, 1925 |
| 2,349,821 | Fragen | May 30, 1944 |
| 2,335,704 | Smith | Nov. 30, 1943 |
| 2,354,652 | Carmody et al. | Aug. 1, 1944 |
| 2,378,733 | Sensel | June 19, 1945 |